C. E. RUSSELL.
Fruit Can.
No. 15,088. Patented June 10, 1856.
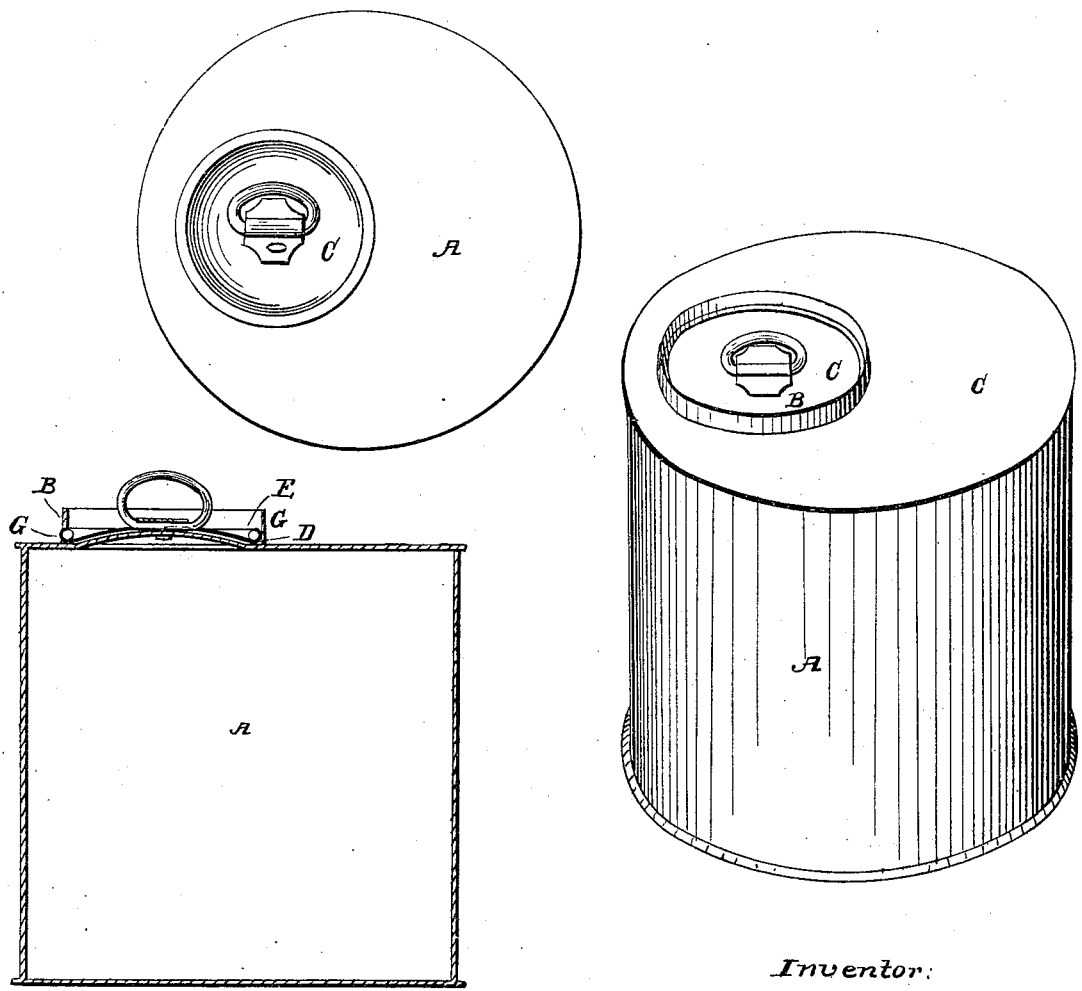
Witnesses:
Inventor:

UNITED STATES PATENT OFFICE.

CHS. E. RUSSELL, OF ST. LOUIS, MISSOURI.

IMPROVEMENT IN HERMETICALLY-SEALING PRESERVE-CANS.

Specification forming part of Letters Patent No. 15,088, dated June 10, 1856.

*To all whom it may concern:*

Be it known that I, CHARLES E. RUSSELL, of St. Louis, in the State of Missouri, have invented a new Self-Sealing Tin Can for Preserving Fruits and Vegetables; and I do hereby declare that the following is a full and exact description thereof, reference being had to the accompanying drawings and model of the same.

The nature of my invention consists in a common tin can with a mouth-piece rim of tin a quarter of an inch wide, in which there is a groove, into which there is put a spring-ring of wire, which securely holds a raised tin cap, which is placed inside of the mouth-piece rim, pressing upon a small projecting ledge by means of an under lining of felt or other substance which may be found suitable.

To enable others skilled in the art of the same to make and use my invention, I will proceed to describe its construction and operation.

Take a common tin can, A, and solder on a mouth-piece, B, one-quarter of an inch rim, one-eighth of an inch from the edge of the hole in the top of the can. Place a raised tin cap, C, in the rim. To the concave side of cap is attached a round piece of felt, D, or other suitable substance. The cap C being then put in, it is secured to its place by a wire ring, E, sprung into the rim and placed into the groove G to receive it. This being done, the whole is made air-tight by filling the rim with a suitable preparation of wax or rosin, or other suitable substance.

Use of the same: Is to preserve all kinds of fruits and vegetables for a year or more, the air being excluded by heating the can in boiling water. When thus expelled, the can should be immediately sealed, which most effectually secures it against all liability of fermentation and preserves the contents of the can in its original freshness for many years.

What I claim as my invention, and desire to secure by Letters Patent, is—

The combination of the spring-ring E and groove G, or its equivalent, in the manner described, and for the purposes specified.

CHAS. E. RUSSELL.

Witnesses:
 H. S. STILES,
 GEO. M. WILLING.